(12) United States Patent
Zhang et al.

(10) Patent No.: US 9,668,211 B2
(45) Date of Patent: May 30, 2017

(54) UE PAGING METHOD, BASE STATION, AND UE

(71) Applicant: Huawei Technologies Co., Ltd., Shenzhen (CN)

(72) Inventors: Lixue Zhang, Beijing (CN); Zhenxing Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 14/704,755

(22) Filed: May 5, 2015

(65) Prior Publication Data

US 2015/0237577 A1 Aug. 20, 2015

Related U.S. Application Data

(63) Continuation of application No. PCT/CN2012/084133, filed on Nov. 6, 2012.

(51) Int. Cl.
*H04W 52/02* (2009.01)
*H04W 68/02* (2009.01)
(Continued)

(52) U.S. Cl.
CPC ....... *H04W 52/0216* (2013.01); *H04L 5/0053* (2013.01); *H04W 4/005* (2013.01); *H04W 68/02* (2013.01)

(58) Field of Classification Search
CPC . H04W 52/0216; H04W 4/005; H04W 68/02; H04L 5/0053
(Continued)

(56) References Cited

U.S. PATENT DOCUMENTS

| 2010/0130237 A1 | 5/2010 | Kitazoe et al. |
| 2012/0263106 A1 | 10/2012 | Lee et al. |
| 2013/0003629 A1* | 1/2013 | Jeong ............... H04W 52/0216 370/311 |

FOREIGN PATENT DOCUMENTS

| CN | 102202377 A | 9/2011 |
| CN | 102257859 A | 11/2011 |
| CN | 102740460 A | 10/2012 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 11)," 3GPP TS 36.304, V11.1.0, Sep. 2012, 33 pages.

(Continued)

*Primary Examiner* — Obaidul Huq
(74) *Attorney, Agent, or Firm* — Slater Matsil, LLP (57) ABSTRACT

A UE paging method, a base station, and a UE are disclosed. The method includes receiving, by the base station, a paging message that is used for paging the UE and delivered by a core network side, where the paging message includes an eDRX cycle that serves as a first parameter, and a second parameter used for identifying a quantity of super frames for which a normal state lasts in the eDRX cycle; calculating, by the base station according to a UE identifier of the UE, the first parameter, and the second parameter, a super frame used for paging the UE; and if it is determined that a current super frame matches with the super frame used for paging the UE, that is, the current super frame is in a normal state, delivering, by the base station, the paging message to the UE in the current super frame.

20 Claims, 5 Drawing Sheets

(51) Int. Cl.
　　　*H04W 4/00*　　　(2009.01)
　　　*H04L 5/00*　　　(2006.01)
(58) Field of Classification Search
　　　USPC .................................................. 370/310, 311
　　　See application file for complete search history.

(56) References Cited

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.1.0, Sep. 2012, 325 pages.

"3rd Generation Partnership Project; Technical Specification Group Radio Access Network; Evolved Universal Terrestrial Radio Access Network (E-UTRAN); S1 Application Protocol (S1AP) (Release 11)," 3GPP TS 36.413, V11.1.0, Sep. 2012, 262 pages.

Nokia Siemens Networks et al., "Extended Paging Cycles," 3GPP Tsg SA2 Meeting #93, S2-123728, Oct. 8-12, 2012, 3 pp.

ZTE, "Enhanced DRX Mode for UE Power Saving," SA WG2 Meeting #93, S2-123545, Oct. 8-12, 2012, 4 pages.

\* cited by examiner

UE PAGING METHOD, BASE STATION, AND UE

This application is a continuation of International Application No. PCT/CN2012/084133, filed on Nov. 6, 2012, which is hereby incorporated by reference in its entirety.

TECHNICAL FIELD

The present invention relates to the field of communications technologies, and in particular, to a user equipment (UE) paging method, a base station, and a UE.

BACKGROUND

An Internet of Things (Machine to Machine, M2M) technology connects an article to Internet by using an information sensing device, so as to implement a network with intelligent identification and management. The M2M is huger than the existing Internet, and can be widely applied to fields, such as a smart grid, intelligent transportation, environment protection, and smart household. After the Internet of Things is combined with a wireless communications technology, a UE in the Internet of Things can report application data in a UE paging manner defined in a Long Term Evolution (LTE) system when the UE receives a paging message. In the LTE system, paging is performed on the UE according to a paging cycle, and a length of the paging cycle is limited by a system frame (System Frame, SF), where a length of each SF is 10 ms, and each SF includes ten subframes. An SF number (System Frame Number) is numbered in a cycle of 1024, and SFNs in each cycle are 0 to 1023; therefore, in the LTE system, a possible longest paging cycle is 1024 times of length of an SF, that is, 10.24s.

Many UEs in the Internet of Things have a delay-tolerant characteristic. These UEs may report application data once every day or every few days, and stay in a standby state in the rest of the time, especially in some occasions in which the UEs are further required to have a function of an extra-long standby time. For example, in wild monitoring and animal protection, the UEs may be required to stay standby for one year or even a longer time. However, in the prior art, an allowed maximum value of the paging cycle is 10.24s. Therefore, if the paging cycle is applied to the UEs in the Internet of Things, the paging cycle is difficult to match with a delay characteristic of these UEs. As a result, these UEs need to be frequently woken up according to the paging cycle, but in most of the time when the UE is woken up, there is no need to report the application data, which consumes power of the UE, shortens a standby time, makes it difficult to meet a requirement of an extra-long standby time, and reduces performance of an M2M network.

SUMMARY

Embodiments of the present invention provide a UE paging method, a base station, and a UE, so as to resolve a problem that UE power consumption is high and network performance is poor because a paging cycle in an M2M network does not match with a delay characteristic of the UE.

To resolve the foregoing technical problem, the embodiments of the present invention disclose the following technical solutions:

According to a first aspect, a user equipment UE paging method is provided, where the method includes: receiving, by a base station, a paging message that is used for paging a UE and delivered by a core network side, where the paging message includes an extended discontinuous reception eDRX cycle that serves as a first parameter, and a second parameter used for identifying a quantity of super frames for which a normal state lasts in the eDRX cycle; calculating, by the base station according to a UE identifier of the UE, the first parameter, and the second parameter, a super frame used for paging the UE; and if it is determined that a current super frame matches with the super frame used for paging the UE, that is, the current super frame is in the normal state, delivering, by the base station, the paging message to the UE in the current super frame.

With reference to the first aspect, in a first possible implementation manner, the calculating, by the base station according to a UE identifier of the UE, the first parameter, and the second parameter, a super frame used for paging the UE includes: performing modulo operation on the UE identifier and the first parameter to obtain a third parameter; and acquiring a super frame number that meets the following formula, and using a super frame corresponding to the super frame number as the super frame used for paging the UE: the super frame number mod the first parameter=Enu [the third parameter, (the third parameter+1) mod the first parameter, . . . , (the third parameter+the second parameter) mod the first parameter], where Enu represents enumeration and mod represents modulo operation.

With reference to the first aspect or the first possible implementation manner, in a second possible implementation manner, the first parameter and the second parameter include: a first parameter and a second parameter that are reported by the UE to the core network side; or a first parameter and a second parameter that are designated by the core network side.

With reference to the first aspect, or the first possible implementation manner, or the second possible implementation manner, in a third possible implementation manner, where the determining whether a current super frame matches with the super frame used for paging the UE includes: acquiring a super frame number of the current super frame; and when the super frame number of the current super frame is the super frame number of the super frame used for paging the UE, determining that the current super frame matches with the super frame used for paging the UE.

With reference to the first aspect, or the first possible implementation manner, or the second possible implementation manner, or the third possible implementation manner, in a fourth possible implementation manner, the delivering, by the base station, the paging message to the UE in the current super frame includes: calculating, by the base station, a system frame, used for paging the UE, in the current super frame, and a subframe in the system frame; and delivering, by the base station, the paging message to the UE in the subframe in the system frame.

According to a second aspect, a UE paging method is provided, where the method includes: acquiring, by a UE, an extended discontinuous reception eDRX cycle that serves as a first parameter, and a second parameter used for identifying a quantity of super frames for which a normal state lasts in the eDRX cycle; calculating, by the UE according to a UE identifier of the UE, the first parameter, and the second parameter, a super frame used for receiving a paging message; and if it is determined that a current super frame matches with the super frame used for receiving the paging message, that is, the current super frame is in the normal state, receiving, by the UE in the current super frame, the paging message delivered by a base station.

With reference to the second aspect, in a first possible implementation manner, the calculating, by the UE according to a UE identifier of the UE, the first parameter, and the second parameter, a super frame used for receiving a paging message includes: performing modulo operation on the UE identifier and the first parameter to obtain a third parameter; and acquiring a super frame number that meets the following formula, and using a super frame corresponding to the super frame number as the super frame used for receiving the paging message: the super frame number mod the first parameter=Enu [the third parameter, (the third parameter+1) mod the first parameter, . . . , (the third parameter+the second parameter) mod the first parameter], where Enu represents enumeration and mod represents modulo operation.

With reference to the second aspect or the first possible implementation manner, in a second possible implementation manner, the first parameter and the second parameter include: a first parameter and a second parameter that are set by the UE; or a first parameter and a second parameter that are delivered, during UE attach, by the core network side to the UE by using a non-access stratum NAS message.

With reference to the second aspect, or the first possible implementation manner, or the second possible implementation manner, in a third possible implementation manner, where the determining that a current super frame matches with the super frame used for receiving the paging message includes: acquiring a super frame number of the current super frame; and when the super frame number of the current super frame is the super frame number of the super frame used for receiving the paging message, determining that the current super frame matches with the super frame used for receiving the paging message.

With reference to the third possible implementation manner, in a fourth possible implementation manner, the acquiring a super frame number of the current super frame is specifically: acquiring the super frame number that is of the current super frame and is broadcasted by the base station by means of system information, where the base station broadcasts, in the current super frame, the super frame number for a preset quantity of times; and the system information includes a system information block 1 or a reset system information block.

With reference to the second aspect, or the first possible implementation manner, or the second possible implementation manner, or the third possible implementation manner, or the fourth possible implementation manner, in a fifth possible implementation manner, the receiving, by the UE in the current super frame, the paging message delivered by a base station includes: calculating, by the UE, a system frame, used for receiving the paging message, in the current super frame, and a subframe in the system frame; and receiving, by the UE in the subframe in the system frame, the paging message delivered by the base station.

According to a third aspect, a base station is provided, where the base station includes: a receiving unit, configured to receive a paging message that is used for paging a UE and delivered by a core network side, where the paging message includes an extended discontinuous reception eDRX cycle that serves as a first parameter, and a second parameter used for identifying a quantity of super frames for which a normal state lasts in the eDRX cycle; a calculating unit, configured to calculate, according to a UE identifier of the UE, and the first parameter and second parameter received by the receiving unit, a super frame used for paging the UE; a determining unit, configured to determine whether a current super frame matches with the super frame that is used for paging the UE and that is obtained by calculation by the calculating unit; and a delivering unit, configured to: when the determining unit determines that the current super frame matches with the super frame used for paging the UE, that is, the current super frame is in the normal state, deliver the paging message to the UE in the current super frame.

With reference to the third aspect, in a first possible implementation manner, the calculating unit includes: a third parameter acquiring subunit, configured to perform modulo operation on the UE identifier and the first parameter to obtain a third parameter; and a super frame number acquiring subunit, configured to acquire a super frame number that meets the following formula, and use a super frame corresponding to the super frame number as the super frame used for paging the UE: the super frame number mod the first parameter=Enu [the third parameter, (the third parameter+1) mod the first parameter, . . . , (the third parameter+the second parameter) mod the first parameter], where Enu represents enumeration and mod represents modulo operation.

With reference to the third aspect or the first possible implementation manner, in a second possible implementation manner, the determining unit includes: the super frame number acquiring subunit, configured to acquire a super frame number of the current super frame; and a super frame matching subunit, configured to: when the super frame number of the current super frame acquired by the super frame number acquiring subunit is the super frame number of the super frame used for paging the UE, determine that the current super frame matches with the super frame used for paging the UE.

With reference to the third aspect, or the first possible implementation manner, or the second possible implementation manner, in a third possible implementation manner, the delivering unit includes: a system frame and subframe calculating subunit, configured to calculate a system frame, used for paging the UE, in the current super frame, and a subframe in the system frame; and a paging message delivering subunit, configured to deliver the paging message to the UE in the subframe that is in the system frame and that is obtained by calculation by the system frame and subframe calculating subunit.

According to a fourth aspect, a base station is provided, where the base station includes: a transceiver, configured to receive a paging message that is used for paging a UE and delivered by a core network side, where the paging message includes an extended discontinuous reception eDRX cycle that serves as a first parameter, and a second parameter used for identifying a quantity of super frames for which a normal state lasts in the eDRX cycle; and a processor, configured to calculate, according to a UE identifier of the UE, and the first parameter and second parameter received by the transceiver, a super frame used for paging the UE, and determine whether a current super frame matches with the super frame used for paging the UE; where the transceiver is further configured to: when the processor determines that the current super frame matches with the super frame used for paging the UE, that is, the current super frame is in the normal state, deliver the paging message to the UE in the current super frame.

With reference to the fourth aspect, in a first possible implementation manner, the processor is specifically configured to perform modulo operation on the UE identifier and the first parameter to obtain a third parameter, acquire a super frame number that meets the following formula, and use a super frame corresponding to the super frame number as the super frame used for paging the UE: the super frame number mod the first parameter=Enu [the third parameter, (the third parameter+1) mod the first parameter, . . . , (the third parameter+the second parameter) mod the first parameter], where Enu represents enumeration and mod represents modulo operation.

With reference to the fourth aspect or the first possible implementation manner, in a second possible implementation manner, the processor is specifically configured to acquire a super frame number of the current super frame, and when the super frame number of the current super frame is the super frame number of the super frame used for paging the UE, determine that the current super frame matches with the super frame used for paging the UE.

With reference to the fourth aspect, or the first possible implementation manner, or the second possible implementation, in a third possible implementation manner, the processor is further configured to calculate a system frame, used for paging the UE, in the current super frame, and a subframe in the system frame; and the transceiver is specifically configured to deliver the paging message to the UE in the subframe that is in the system frame and that is obtained by calculation by the processor.

According to a fifth aspect, a user equipment UE is provided, where the UE includes: an acquiring unit, configured to acquire an extended discontinuous reception eDRX cycle that serves as a first parameter, and a second parameter used for identifying a quantity of super frames for which a normal state lasts in the eDRX cycle; a calculating unit, configured to calculate, according to a UE identifier of the UE, and the first parameter and second parameter acquired by the acquiring unit, a super frame used for receiving a paging message; a determining unit, configured to determine whether a current super frame matches with the super frame that is used for receiving the paging message and that is obtained by calculation by the calculating unit; and a receiving unit, configured to: when the determining unit determines that the current super frame matches with the super frame used for receiving the paging message, that is, the current super frame is in the normal state, receive, in the current super frame, the paging message delivered by a base station.

With reference to the fifth aspect, in a first possible implementation manner, the calculating unit includes: a third parameter acquiring subunit, configured to perform modulo operation on the UE identifier and the first parameter to obtain a third parameter; and a super frame number acquiring subunit, configured to acquire a super frame number that meets the following formula, and use a super frame corresponding to the super frame number as the super frame used for receiving the paging message: the super frame number mod the first parameter=Enu [the third parameter, (the third parameter+1) mod the first parameter, . . . , (the third parameter+the second parameter) mod the first parameter], where Enu represents enumeration and mod represents modulo operation.

With reference to the fifth aspect or the first possible implementation manner, in a second possible implementation manner, the determining unit includes: the super frame number acquiring subunit, configured to acquire a super frame number of the current super frame; and a super frame matching subunit, configured to: when the super frame number of the current super frame acquired by the super frame number acquiring subunit is the super frame number of the super frame used for receiving the paging message, determine that the current super frame matches with the super frame used for receiving the paging message.

With reference to the fifth aspect, or the first possible implementation manner, or the second possible implementation manner, in a third possible implementation manner, the receiving unit includes: a system frame and subframe calculating subunit, configured to calculate a system frame, used for receiving the paging message, in the current super frame, and a subframe in the system frame; and a paging message receiving subunit, configured to receive, in the subframe that is in the system frame and obtained by calculation by the system frame and subframe calculating subunit, the paging message delivered by the base station.

According to a sixth aspect, a UE is provided, where the UE includes: a processor, configured to acquire an extended discontinuous reception eDRX cycle that serves as a first parameter, and a second parameter used for identifying a quantity of super frames for which a normal state lasts in the eDRX cycle; calculate, according to a UE identifier of the UE, the first parameter, and the second parameter, a super frame used for receiving a paging message; and determine whether a current super frame matches with the super frame used for receiving the paging message; and a radio transceiver, configured to: when the processor determines that the current super frame matches with the super frame used for receiving the paging message, that is, the current super frame is in the normal state, receive, in the current super frame, the paging message delivered by a base station.

With reference to the sixth aspect, in a first possible implementation manner, the processor is specifically configured to perform modulo operation on the UE identifier and the first parameter to obtain a third parameter, acquire a super frame number that meets the following formula, and use a super frame corresponding to the super frame number as the super frame used for receiving the paging message: the super frame number mod the first parameter=Enu [the third parameter, (the third parameter+1) mod the first parameter, . . . , (the third parameter+the second parameter) mod the first parameter], where Enu represents enumeration and mod represents modulo operation.

With reference to the sixth aspect or the first possible implementation manner, in a second possible implementation manner, the processor is specifically configured to acquire a super frame number of the current super frame, and when the super frame number of the current super frame is the super frame number of the super frame used for receiving the paging message, determine that the current super frame matches with the super frame used for receiving the paging message.

With reference to the sixth aspect, or the first possible implementation manner, or the second possible implementation manner, in a third possible implementation manner, the processor is further configured to calculate a system frame, used for receiving the paging message, in the current super frame, and a subframe in the system frame; and the radio transceiver is specifically configured to receive, in the subframe that is in the system frame and obtained by calculation by the processor, the paging message delivered by the base station.

In the embodiments of the present invention, a base station receives a paging message that is used for paging a UE and delivered by a core network side, where the paging message includes an eDRX cycle that serves as a first parameter, and a second parameter used for identifying a quantity of super frames for which a normal state lasts in the eDRX cycle; calculates, according to a UE identifier of the UE, the first parameter, and the second parameter, a super frame used for paging the UE; and if it is determined that a current super frame matches with the super frame used for paging the UE, that is, the current super frame is in the normal state, delivers the paging message to the UE in the current super frame. In the embodiments of the present invention, by setting an eDRX cycle represented by a super frame, paging for a UE in an M2M network can be implemented in a longer paging cycle, so that the UE in the M2M network does not need to be frequently woken up, which saves power of the UE, and improves paging performance of the M2M network while achieving adaptation to a delay characteristic of the UE.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following embodiments of the present invention provide a UE paging method, a base station, and a UE.

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

In an existing LTE network, an SF is numbered to generate an SFN, where the SFN is circularly numbered in a cycle of 1024, and SFNs in each cycle are 0 to 1023. Each SF consists of 10 subframes and each subframe is 1 ms. Therefore, one SF is 10 ms and a length of SFs in each SFN cycle is 10.24s. A longest paging cycle in the prior art cannot exceed a length of one SFN cycle. When the longest paging cycle exceeds the length of one SFN cycle, even if the UE obtains an SFN by calculation, the UE cannot learn an SFN cycle to which the SFN belongs, which leads to a paging failure.

A power saving monitoring mechanism of the LTE network is referred to as discontinuous reception (Discontinuous Reception, DRX), where the DRX is classified into DRX in an idle state (IDLE_DRX) and DRX in a connected state (ACTIVE_DRX). For either type of the foregoing DRX, DRX states all can be classified into a working state and a sleep state. When a UE is in the working state, the UE is woken up from a sleep state, monitors a downlink channel and performs uplink data transmission; when the UE is in the sleep state, the UE enters the sleep state, stops monitoring a radio channel, and stops uplink data transmission. With the DRX mechanism, a UE may no longer continuously monitor a radio channel, thereby reducing power consumption of the UE.

When the UE is in the IDLE_DRX, the UE does not establish a radio resource control (RRC) connection; therefore, the UE needs to be woken up from the working state, so as to monitor a paging message delivered by a base station and further determine whether an RRC connection needs to be established. After being woken up, the UE monitors a physical downlink control channel (PDCCH) in a specific subframe corresponding to a specific SFN, so as to acquire a paging-radio network temporary identifier (P-RNTI) that may be delivered by the base station through the PDCCH. When obtaining a system frame and a subframe that are used to monitor the PDCCH, the UE first needs to obtain a DRX cycle broadcasted by the base station. Generally, in the IDLE_DRX, a paging cycle of the UE is the DRX cycle.

In this embodiment of the present invention, a radio frame in each cycle in the prior art is further defined as a super frame (SupF), and a super frame number (SupFN) is set correspondingly. Specifically, super frames, each of which consists of 1024 radio frames, are numbered in sequence. Because duration of each SF is 10 ms, a length of each super frame is 10.24s. A length of a SupFN may be 10 bits (that is, 1024 super frames), 8 bits (256 super frames), 6 bits (64 super frames), and duration of each corresponding group of numbers are 174 minutes, 43 minutes, and 11 minutes respectively. In the embodiments of the present invention, in the IDLE_DRX, in order to implement paging for a delay-tolerant UE in a network in a longer paging cycle, a DRX cycle in unit of super frames is set, where the cycle may be referred to as an extended DRX (extended DRX, eDRX) cycle, so as to be differentiated from a DRX cycle set in the prior art.

In the embodiments of the present invention, counting is performed in unit of super frames in each eDRX cycle. Each eDRX cycle is classified into a normal state and an inactive state, and both duration of the normal state and duration of the inactive state are an integral multiple of a duration length of a super frame, that is, for the normal state and the inactive state, counting is also performed in unit of super frames. For example, an eDRX cycle lasts for 5 super frames, where the normal state lasts for 2 super frames, and the inactive state lasts for 3 super frames. When the UE is in the normal state, the UE jumps to the DRX mechanism in the prior art; when the UE is in the inactive state, the UE enters the sleep state.

In the embodiments of the present invention, a length of a paging cycle of a UE is extended by setting an eDRX cycle; therefore, when performing paging for a UE, a base station first needs to obtain a super frame (represented by a super frame number) used for paging the UE, and then obtains, according to a manner in the prior art, an SF (represented by an SFN) and a subframe (represented by a subframe number) that are in the super frame and are used for paging the UE. The following describes the embodiment of the present invention with reference to a UE paging process.

Figure 1A:
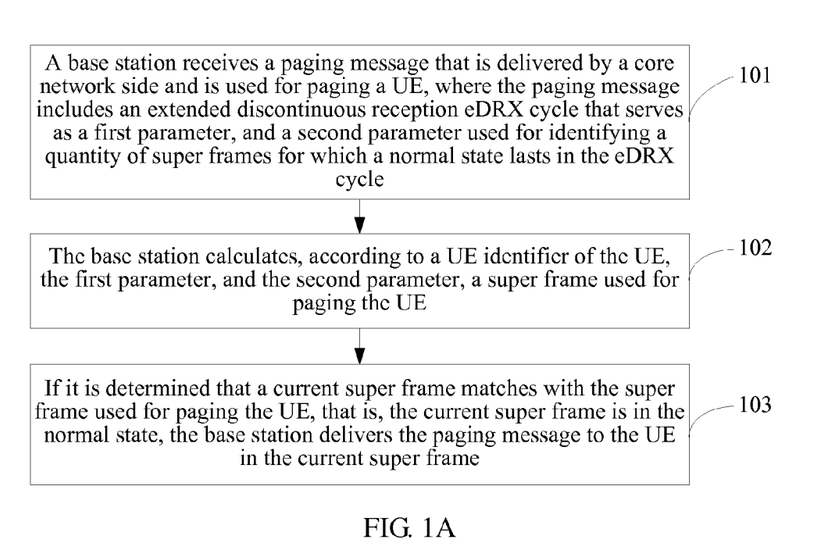
FIG. 1A is a flowchart of an embodiment of a UE paging method according to the present invention.

Refer to FIG. 1A, which is a flowchart of an embodiment of a UE paging method according to the present invention. This embodiment describes a UE paging process from a base station side.

Step 101: A base station receives a paging message that is used for paging a UE and delivered by a core network side, where the paging message includes an extended discontinuous reception eDRX cycle that serves as a first parameter, and a second parameter used for identifying a quantity of super frames for which a normal state lasts in the eDRX cycle.

Figure 1B:
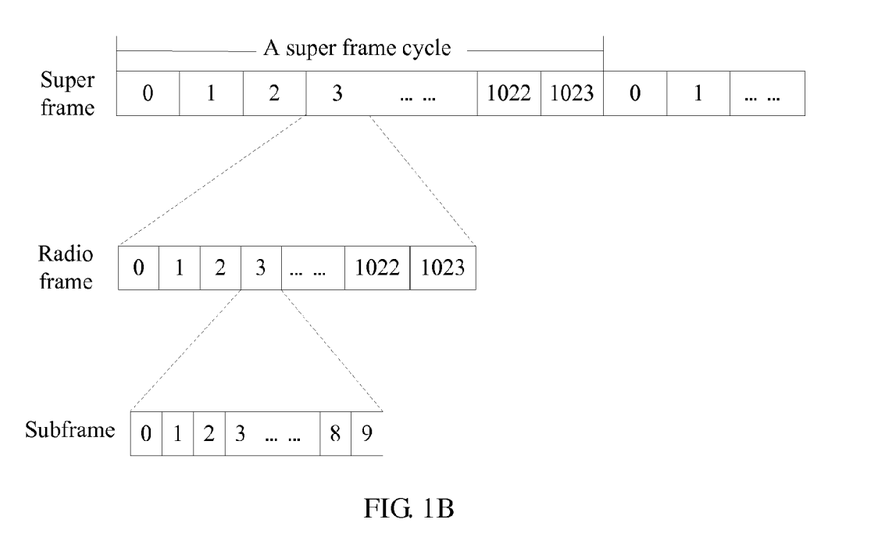
FIG. 1B is a schematic diagram of a relationship between a super frame, a system frame, and a subframe according to an embodiment of the present invention.

Refer to FIG. 1B, which is a schematic diagram of a relationship between a super frame, a system frame, and a subframe according to an embodiment of the present invention.

A super frame shown in FIG. 1B includes 1024 SFs, and each SF includes 10 subframes.

Figure 1C:
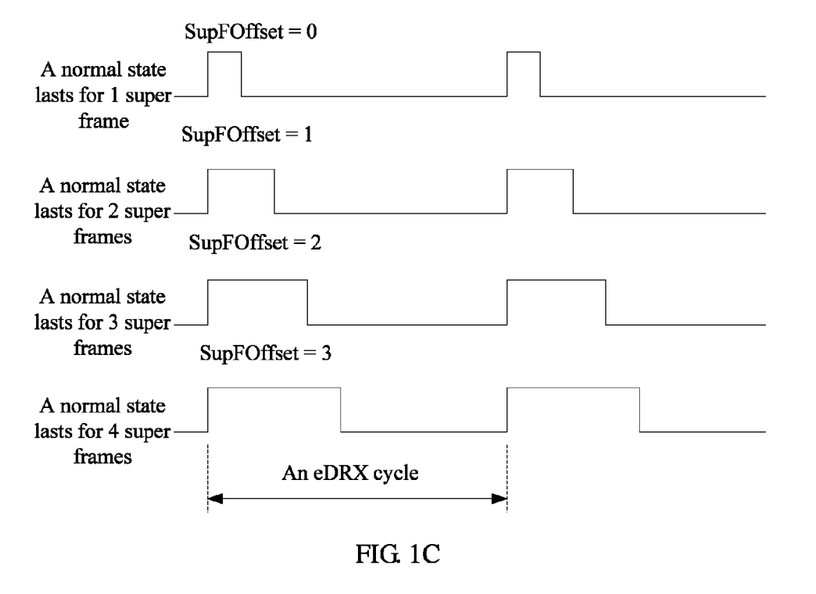
FIG. 1C is a schematic diagram of a correspondence between an eDRX cycle and a SupFOffset according to an embodiment of the present invention.

Refer to FIG. 1C, which is a schematic diagram of a correspondence between an eDRX cycle and a SupFOffset according to an embodiment of the present invention.

FIG. 1C shows, from top to bottom, schematics of a normal state that lasts for different quantities of super frames in an eDRX cycle. The schematics include the following situations: the normal state lasts for one super frame, where correspondingly, a SupFOffset (the second parameter) used for identifying the quantity of super frames for which the normal state lasts in the eDRX cycle is 0; the normal state lasts for two super frames, where correspondingly, the SupFOffset (the second parameter) used for identifying the quantity of super frames for which the normal state lasts in the eDRX cycle is 1; the normal state lasts for three super frames, where correspondingly, the SupFOffset (the second parameter) used for identifying the quantity of super frames for which the normal state lasts in the eDRX cycle is 2; and the normal state lasts for four super frames, where correspondingly, the SupFOffset (the second parameter) used for identifying the quantity of super frames for which the normal state lasts in the eDRX cycle is 3.

In this embodiment, a core network side device used for delivering the paging message may be a mobility management entity (Mobility Management Entity, MME) or a serving general packet radio service support node (Serving General Packet Radio Service Support Node, SGSN). When the MME receives a downlink data arrival indication sent by a service gateway (Service Gateway, S-GW) on the core network side, if it is determined that a target UE to which the downlink data is transmitted is a UE that has a delay tolerance characteristic, the MME delivers, to the base station, a paging message used for paging the UE, where the paging message includes the eDRX cycle that serves as the first parameter, and the second parameter used for identifying the quantity of super frames for which the normal state lasts in the eDRX cycle; further, the paging message may further include a delay tolerance indication that indicates a type of the UE. The first parameter and the second parameter that are carried by the paging message may be a first parameter and a second parameter that are reported by the UE to the core network side when the UE initially accesses a network, or a first parameter and a second parameter that are designated by the core network side, where the second parameter may not be delivered to the base station during paging, and the base station regards that the second parameter is set to the default value 0.

Step 102: The base station calculates, according to a UE identifier of the UE, the first parameter, and the second parameter, a super frame used for paging the UE.

In this embodiment, after receiving the paging message, the base station may obtain the UE identifier of the UE, the first parameter, and the second parameter. The base station first performs modulo operation on the UE identifier and the first parameter to obtain a third parameter, where the UE identifier may specifically be an international mobile subscriber identification (International Mobile Subscriber Identification, IMSI) of the UE; then the base station acquires a super frame number that meets the following formula, and uses a super frame corresponding to the super frame number as the super frame used for paging the UE: the super frame number mod the first parameter=Enu [the third parameter, (the third parameter+1) mod the first parameter, . . . , (the third parameter+the second parameter) mod the first parameter], where Enu represents enumeration and mod represents modulo operation. The quantity of the super frame numbers obtained by calculation varies with the second parameter.

Step 103: If it is determined that a current super frame matches with the super frame used for paging the UE, that is, the current super frame is in the normal state, the base station delivers the paging message to the UE in the current super frame.

In this embodiment, the base station acquires a super frame number of the current super frame. The base station may broadcast the super frame number of the current super frame to the UE by using system information, where the system information may include: a system information block 1 (System Information Block1, SIB1), where the SIB1 is broadcasted in a cycle of 80 ms, or an SIB2, or the base station may set again a new system information block that is used to broadcast the super frame number, which is not limited in this embodiment of the present invention.

In this embodiment, when the super frame number of the current super frame is the super frame number of the super frame that is used for paging the UE and that is obtained by calculation in the foregoing step 102, it is determined that the current super frame matches with the super frame used for paging the UE; further, the base station may calculate, in a calculation manner in the prior art, an SF that is in the current super frame and is used for paging the UE, and a subframe in the SF, and deliver the paging message to the UE in the subframe in the SF.

It may be learned from the foregoing embodiment that, in this embodiment, by setting an eDRX cycle represented by a super frame, paging for a UE in an M2M network can be implemented in a longer paging cycle, so that the UE in the M2M network does not need to be woken up frequently, which saves power of the UE, and and improves paging performance of the M2M network while adapting to a delay characteristic of the UE.

Figure 2:
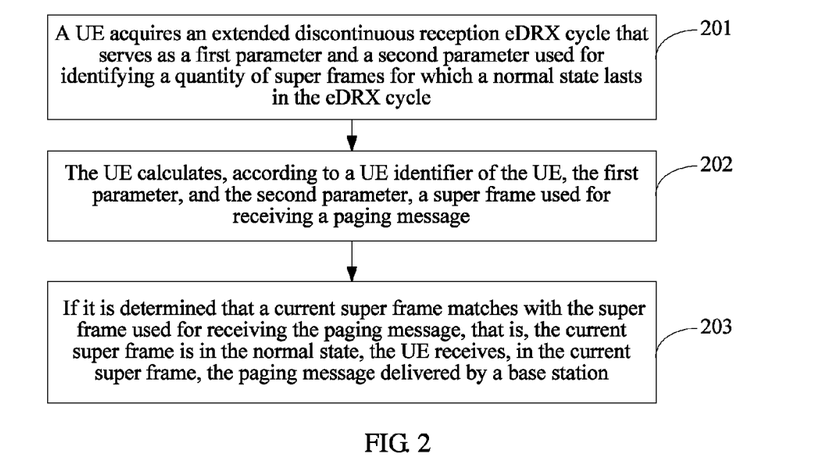
FIG. 2 is a flowchart of another embodiment of a UE paging method according to the present invention.

Refer to FIG. 2, which is a flowchart of another embodiment of a UE paging method according to the present invention. This embodiment describes a UE paging process from a UE side.

Step 201: A UE acquires an extended discontinuous reception eDRX cycle that serves as a first parameter, and a second parameter used for identifying a quantity of super frames for which a normal state lasts in the eDRX cycle.

In this embodiment, a relationship between a super frame, a system frame, and a subframe may be shown in FIG. 1B above. An example in which the normal state lasts for different quantities of super frames in the eDRX cycle may be shown in FIG. 1C, and details are not described herein again.

In this embodiment, the first parameter and the second parameter that are acquired by the UE may be a first parameter and a second parameter that are reported by the UE to a core network side when the UE initially accesses the network, or a first parameter and a second parameter that are designated, during UE attach, by the core network side by using a non-access stratum (Non-Access Stratum, NAS) message. When the first parameter and the second parameter are parameters designated by the core network side by using the NAS message, when initially accessing the network, the UE may receive the first parameter and the second parameter that are sent by an MME on the core network side by using the NAS message, where the second parameter may be omitted, and the UE sets the second parameter to a default value 0.

Step 202: The UE calculates, according to a UE identifier of the UE, the first parameter, and the second parameter, a super frame used for receiving a paging message.

In this embodiment, after the UE acquires the first parameter and the second parameter, the UE first performs modulo operation on the UE identifier of the UE and the first parameter to obtain a third parameter, where the UE identifier may specifically be an IMSI of the UE; then the UE acquires a super frame number that meets the following formula, and uses a super frame corresponding to the super frame number as the super frame used for receiving the paging message: the super frame number mod the first parameter=Enu [the third parameter, (the third parameter+1) mod the first parameter, . . . , (the third parameter+the second parameter) mod the first parameter], where Enu represents enumeration and mod represents modulo operation. The quantity of the super frame numbers obtained by calculation varies with the second parameter.

Step 203: If it is determined that a current super frame matches with the super frame used for receiving the paging message, that is, the current super frame is in the normal state, the UE receives, in the current super frame, the paging message delivered by a base station.

In this embodiment, the UE may acquire a super frame number of the current super frame. Optionally, the UE may acquire the super frame number that is of the current super frame and is broadcasted by the base station by using system information, where the base station may set a quantity of times of broadcasting the super frame number in each super frame, or an interval for broadcasting the super frame number in each super frame, so that the UE can obtain the super frame number of the current super frame whenever the UE accesses the network. Alternatively, the UE may acquire, when accessing the network for the first time, a super frame number that is broadcasted by the base station by using system information, and subsequently, the UE may calculate the super frame number of the current super frame according to the first broadcasted super frame number. The system information may include: an SIB1, where the SIB1 is broadcasted in a cycle of 80 ms, or an SIB2, or the base station may set again a new system information block used for broadcasting the super frame number, which is not limited in this embodiment of the present invention.

In this embodiment, if a super frame number of a current super frame is a super frame number that is used for receiving a paging message and that is obtained by calculation in the foregoing step 202, it is determined that the current super frame matches with a super frame used for paging a UE; further, the UE may calculate, in a calculation manner in the prior art, an SF that is in the current super frame and is used for receiving the paging message, and a subframe in the SF, and after being woken up in the subframe in the SF, receive the paging message delivered by a base station.

It may be learned from the foregoing embodiment that, in this embodiment, by setting an eDRX cycle represented by a super frame, paging for a UE in an M2M network can be implemented in a longer paging cycle, so that the UE in the M2M network does not need to be woken up frequently, which saves power of the UE, and improves paging performance of the M2M network while achieving adaptation to a delay characteristic of the UE.

Figure 3:
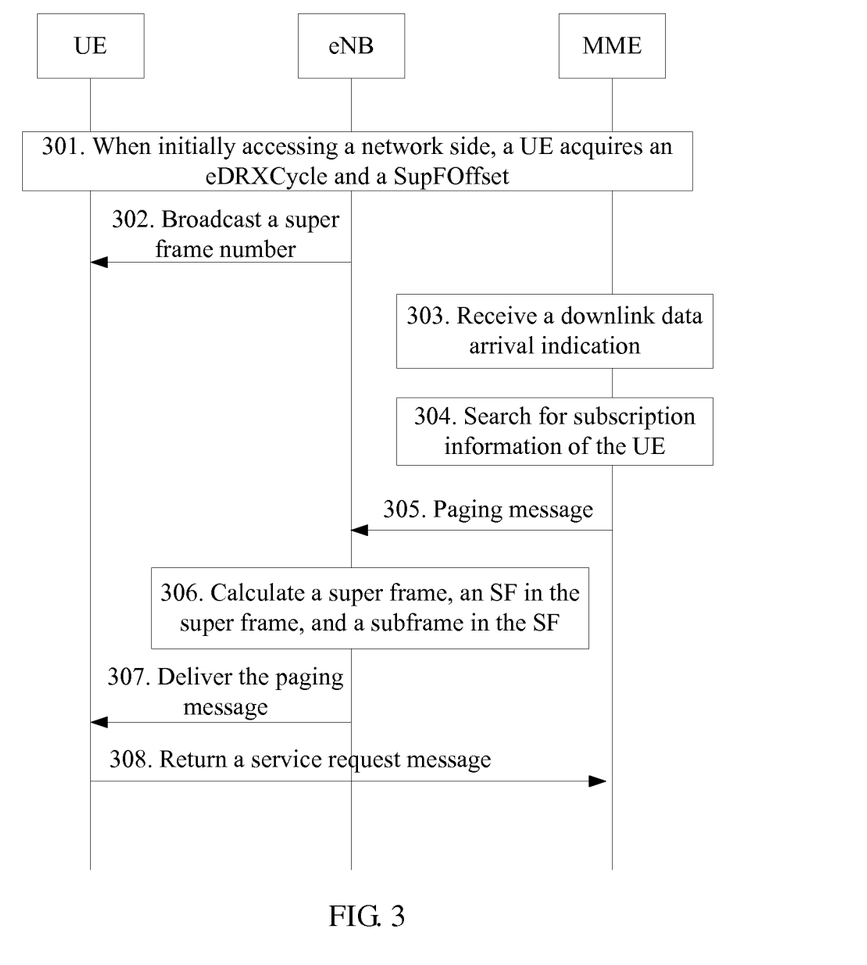
FIG. 3 is a flowchart of another embodiment of a UE paging method according to the present invention.

Refer to FIG. 3, which is a flowchart of another embodiment of a UE paging method according to the present invention. This embodiment describes in detail an application example of paging a UE with reference to interaction among a core network side, a base station, and the UE.

Step 301: When initially accessing a network, the UE obtains an eDRXCycle and a SupFOFFSET that indicates a quantity of super frames for which a normal state lasts, where the SupFOFFSET and the eDRXCycle are sent by an MME.

Step 302: An eNB broadcasts a super frame number of a current super frame.

Step 303: The MME receives a downlink data arrival indication, where the downlink data arrival indication includes a UE identifier of a to-be-paged UE.

Step 304: The MME searches for subscription information of the UE according to the UE identifier, so as to determine that the UE is a UE that has a delay tolerance characteristic.

Step 305: The MME delivers a paging message (Paging) to the eNB, where the paging message may carry the UE identifier, the eDRXCycle, the SupFOffset, and a delay tolerance indication.

Step 306: The eNB determines, according to the delay tolerance indication carried in the paging message, that the to-be-paged UE is a UE that has the delay tolerance characteristic, and then calculates, according to the UE identifier, the eDRXCycle, and the SupFOffset, a super frame used for paging the UE, an SF in the super frame, and a subframe in the SF.

In this step, assuming that the super frame used for paging the UE is referred to as a SupFN, the SupFN is a SupFN that meets the following formula:

SupFN mod eDRXCycle=Enu{K, (K+1) mod eDRXCycle, . . . , (K+SupFOffset) mod eDRXCycle}, where K=UE_ID mod eDRXCycle, where mod represents modulo operation, Enu represents enumeration, UE_ID may be an IMSI of the UE or a result value that is obtained by the IMSI mod 1024.

After the SupFN used for paging the UE is calculated, an SF used for paging the UE may further be calculated according to the prior art. Assuming that the SF used for paging the UE is referred to as a paging frame (Paging Frame, PF), the PF is an SFN that meets the following formula:

$$SFN \bmod T = (T \text{ div } N)*(UE\_ID \bmod N)$$

In the foregoing formula, T represents a DRX cycle of the UE, and T=min(UE specific DRX, default DRX value), where UE specific DRX represents a DRX paging cycle designated by the UE; default DRX value represents a default DRX paging cycle broadcasted in a network, that is, a value of T is set to a smaller value between the DRX paging cycle designated by the UE and the default DRX paging cycle broadcasted in the network; div represents exact division; N is min(T, nB), where a value range of nB is 4T, 2T, T, T/2, T/4, T/8, T/16, and T/32.

After the PF is calculated, a subframe used for paging the UE is finally calculated. Assuming that the subframe used for paging the UE is referred to as a paging occasion (Paging Occasion, PO), the PO is generally acquired from a PO look-up table. The following table 1 is a PO look-up table in a frequency division duplex (Frequency Division Duplexing, FDD) mode, and the following table 2 is a PO look-up table in a time division duplex (Time Division Duplexing, TDD) mode.

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

To obtain the PO by querying the foregoing Table 1 or Table 2, indexes i_s and Ns need to be first obtained by calculation, where i_s is calculated according to the following formula:

$$i\_s = \text{floor}(UE\_ID/N) \bmod Ns,$$

$$UE\_ID = IMSI \bmod 1024$$

In the foregoing formulas, floor represents rounding down to the nearest integer after UE_ID is divided by N; Ns is max(1, nB/T), that is, a value of Ns is a larger value between the two values 1 and nB/T.

Step 307: The eNB delivers the paging message to the UE in a subframe that is in the SF in the super frame and that is obtained by calculation.

Step 308: After receiving the paging message, the UE sends a service request (service request) message to the MME.

It should be noted that, FIG. 3 mainly shows a process of calculating, by an eNB, a super frame used for paging a UE, an SF in the super frame, and a subframe in the SF. In an actual application process, after obtaining an eDRXCycle and a SupFOffset, the UE may calculate, according to the UE identifier, the eDRXCycle, and the SunFOffset and by using a calculation manner consistent with that of the eNB, a super frame used for receiving a paging message, an SF in the super frame, and a subframe in the SF, so that after the eNB delivers the paging message in step 307, the UE can be woken up at the same time and receive the paging message. Details are not described herein again.

Corresponding to the embodiments of a UE paging method according to the present invention, the present invention further provides embodiments of a base station and a UE that are used to perform the foregoing method embodiments.

Figure 4:
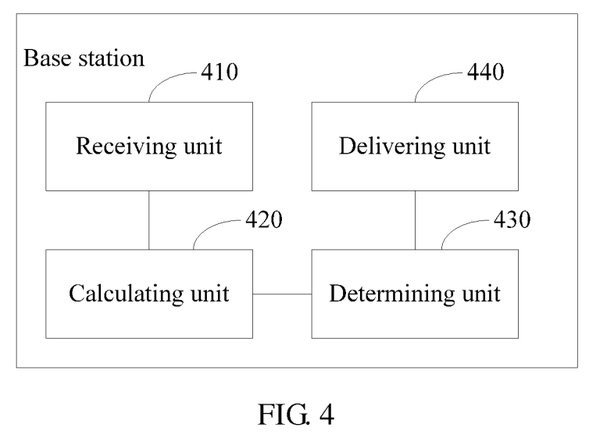
FIG. 4 is a block diagram of an embodiment of a base station according to the present invention.

Refer to FIG. 4, which is a block diagram of an embodiment of a base station according to the present invention.

The base station includes a receiving unit 410, a calculating unit 420, a determining unit 430, and a delivering unit 440.

The receiving unit 410 is configured to receive a paging message that is used for paging a UE and delivered by a core network side, where the paging message includes an extended discontinuous reception eDRX cycle that serves as a first parameter, and a second parameter used for identifying a quantity of super frames for which a normal state lasts in the eDRX cycle.

The calculating unit 420 is configured to calculate, according to a UE identifier of the UE, and the first parameter and second parameter received by the receiving unit 410, a super frame used for paging the UE.

The determining unit 430 is configured to determine whether a current super frame matches with the super frame that is used for paging the UE and that is obtained by calculation by the calculating unit 420.

The delivering unit 440 is configured to: when the determining unit 430 determines that the current super frame matches with the super frame used for paging the UE, that is, the current super frame is in the normal state, deliver the paging message to the UE in the current super frame.

Optionally, the calculating unit 420 may include subunits not shown in FIG. 4. A third parameter acquiring subunit is configured to perform modulo operation on the UE identifier and the first parameter to obtain a third parameter. T super frame number acquiring subunit is configured to acquire a super frame number that meets the following formula, and use a super frame corresponding to the super frame number as the super frame used for paging the UE: the super frame number mod the first parameter=Enu [the third parameter, (the third parameter+1) mod the first parameter, . . . , (the third parameter+the second parameter) mod the first parameter], where Enu represents enumeration and mod represents modulo operation.

Optionally, the determining unit 430 may include subunits not shown in FIG. 4. A super frame number acquiring subunit is configured to acquire a super frame number of the current super frame. A super frame matching subunit is configured to, when the super frame number of the current super frame acquired by the super frame number acquiring subunit is the super frame number of the super frame used for paging the UE, determine that the current super frame matches with the super frame used for paging the UE.

Optionally, the delivering unit 440 may include subunits not shown in FIG. 4. A system frame and subframe calculating subunit is configured to calculate a system frame, used for paging the UE, in the current super frame, and a subframe in the system frame. A paging message delivering subunit is configured to deliver the paging message to the UE in the subframe in the system frame, where the system frame and the subframe are obtained by calculation by the system frame and subframe calculating subunit.

Figure 5:
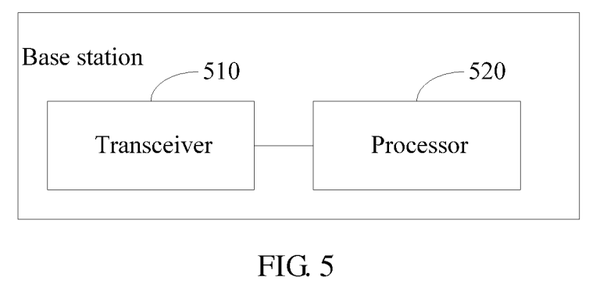
FIG. 5 is a block diagram of another embodiment of a base station according to the present invention.

Refer to FIG. 5, which is a block diagram of another embodiment of a base station according to the present invention.

The base station includes a transceiver 510 and a processor 520.

The transceiver 510 is configured to receive a paging message that is used for paging a UE and delivered by a core network side, where the paging message includes an extended discontinuous reception eDRX cycle that serves as a first parameter, and a second parameter used for identifying a quantity of super frames for which a normal state lasts in the eDRX cycle.

The processor 520 is configured to calculate, according to a UE identifier of the UE, and the first parameter and second parameter received by the transceiver 510, a super frame used for paging the UE, and determine whether a current super frame matches with the super frame used for paging the UE.

The transceiver 510 is further configured to: when the processor determines that the current super frame matches with the super frame used for paging the UE, that is, the current super frame is in the normal state, deliver the paging message to the UE in the current super frame.

Optionally, the processor 520 may be specifically configured to perform modulo operation on the UE identifier and the first parameter to obtain a third parameter, acquire a super frame number that meets the following formula, and use a super frame corresponding to the super frame number as the super frame used for paging the UE: the super frame number mod the first parameter=Enu [the third parameter, (the third parameter+1) mod the first parameter, . . . , (the third parameter+the second parameter) mod the first parameter], where Enu represents enumeration and mod represents modulo operation.

Optionally, the processor 520 may be specifically configured to acquire a super frame number of the current super frame, and when the super frame number of the current super frame is the super frame number of the super frame used for paging the UE, determine that the current super frame matches with the super frame used for paging the UE.

Optionally, the processor 520 is further configured to calculate a system frame, used for paging the UE, in the current super frame, and a subframe in the system frame.

The transceiver 510 is specifically configured to deliver the paging message to the UE in the subframe that is in the system frame and that is obtained by calculation by the processor.

Figure 6:
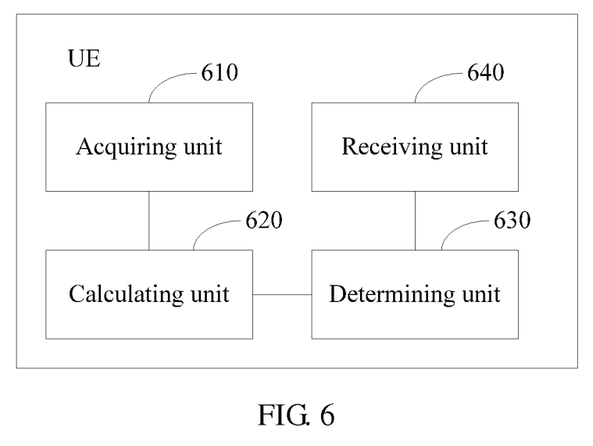
FIG. 6 is a block diagram of an embodiment of a UE according to the present invention.

Refer to FIG. 6, which is a block diagram of an embodiment of a UE according to the present invention.

The UE includes an acquiring unit 610, a calculating unit 620, a determining unit 630, and a receiving unit 640.

The acquiring unit 610 is configured to acquire an extended discontinuous reception eDRX cycle that serves as a first parameter, and a second parameter used for identifying a quantity of super frames for which a normal state lasts in the eDRX cycle.

The calculating unit 620 is configured to calculate, according to a UE identifier of the UE, and the first parameter and second parameter acquired by the acquiring unit 610, a super frame used for receiving a paging message.

The determining unit 630 is configured to determine whether a current super frame matches with the super frame that is used for receiving the paging message and that is obtained by calculation by the calculating unit 620.

The receiving unit 640 is configured to: when the determining unit 630 determines that the current super frame matches with the super frame used for receiving the paging message, that is, the current super frame is in the normal state, receive, in the current super frame, the paging message delivered by a base station.

Optionally, the calculating unit 620 may include (not shown in FIG. 6): a third parameter acquiring subunit, configured to perform modulo operation on the UE identifier and the first parameter to obtain a third parameter; and a super frame number acquiring subunit, configured to acquire a super frame number that meets the following formula, and use a super frame corresponding to the super frame number as the super frame used for receiving the paging message: the super frame number mod the first parameter=Enu [the third parameter, (the third parameter+1) mod the first parameter, . . . , (the third parameter+the second parameter) mod the first parameter], where Enu represents enumeration and mod represents modulo operation.

Optionally, the determining unit 630 may include (not shown in FIG. 6): a super frame number acquiring subunit, configured to acquire a super frame number of the current super frame; and a super frame matching subunit, configured to: when the super frame number of the current super frame acquired by the super frame number acquiring subunit is the super frame number of the super frame used for receiving the paging message, determine that the current super frame matches with the super frame used for receiving the paging message.

Optionally, the receiving unit 640 may include (not shown in FIG. 6): a system frame and subframe calculating subunit, configured to calculate a system frame, used for receiving the paging message, in the current super frame, and a subframe in the system frame; and a paging message receiving subunit, configured to receive, in the subframe that is in the system frame and obtained by calculation by the system frame and subframe calculating subunit, the paging message delivered by the base station.

Figure 7:
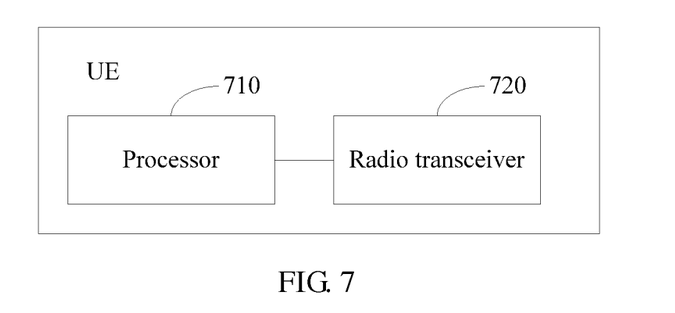
FIG. 7 is a block diagram of another embodiment of a UE according to the present invention.

Refer to FIG. 7, which is a block diagram of another embodiment of a UE according to the present invention.

The UE includes a processor 710 and a radio transceiver 720.

The processor 710 is configured to acquire an extended discontinuous reception eDRX cycle that serves as a first parameter, and a second parameter used for identifying a quantity of super frames for which a normal state lasts in the eDRX cycle; calculate, according to a UE identifier of the UE, the first parameter, and the second parameter, a super frame used for receiving a paging message; and determine whether a current super frame matches with the super frame used for receiving the paging message.

The radio transceiver 720 is configured to: when the processor determines that the current super frame matches with the super frame used for receiving the paging message, that is, the current super frame is in the normal state, receive, in the current super frame, the paging message delivered by a base station.

Optionally, the processor 710 may be specifically configured to perform modulo operation on the UE identifier and the first parameter to obtain a third parameter, acquire a super frame number that meets the following formula, and use a super frame corresponding to the super frame number as the super frame used for receiving the paging message: the super frame number mod the first parameter=Enu [the third parameter, (the third parameter+1) mod the first parameter, . . . , (the third parameter+the second parameter) mod the first parameter], where Enu represents enumeration and mod represents modulo operation.

Optionally, the processor 710 may be specifically configured to acquire a super frame number of the current super frame, and when the super frame number of the current super frame is the super frame number of the super frame used for receiving the paging message, determine that the current super frame matches with the super frame used for receiving the paging message.

Optionally, the processor 710 may be further configured to calculate a system frame, used for receiving the paging message, in the current super frame, and a subframe in the system frame; and the radio transceiver 720 may be specifically configured to receive, in the subframe that is in the system frame and obtained by calculation by the processor, the paging message delivered by the base station.

It can be learned from the foregoing embodiments that, a base station receives a paging message that is used for paging a UE and delivered by a core network side, where the paging message includes an eDRX cycle that serves as a first parameter, and a second parameter used for identifying a quantity of super frames for which a normal state lasts in the eDRX cycle; calculates, according to a UE identifier of the UE, the first parameter, and the second parameter, a super frame used for paging the UE; and if it is determined that a current super frame matches with the super frame used for paging the UE, that is, the current super frame is in the normal state, delivers the paging message to the UE in the current super frame. In the embodiment of the preset invention, by setting an eDRX cycle represented by a super frame, paging for a UE in an M2M network can be implemented in a longer paging cycle, so that the UE in the M2M network does not need to be frequently woken up, which saves power of the UE, and improves paging performance of the M2M network while achieving adaptation to a delay characteristic of the UE.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method of paging a user equipment (UE), the method comprising:
   receiving, by a base station, a paging message that is used for paging a UE and delivered by a core network side, wherein the paging message comprises a first parameter comprising an extended discontinuous reception (eDRX) cycle and a second parameter used to identify a quantity of super frames for which a normal state lasts in the eDRX cycle;
   calculating, by the base station, a super frame used for paging the UE, the super frame being calculated according to a UE identifier of the UE, the first parameter, and the second parameter;
   determining that a current super frame is in the normal state by determining that a current super frame matches the super frame used for paging the UE; and
   delivering, by the base station, the paging message to the UE in the current super frame.

2. The method according to claim 1, wherein calculating the super frame used for paging the UE comprises:
   performing a modulo operation on the UE identifier and the first parameter to obtain a third parameter;
   acquiring a super frame number that meets the formula: the super frame number mod the first parameter=Enu [the third parameter, (the third parameter+1) mod the first parameter, . . . , (the third parameter+the second parameter) mod the first parameter], wherein Enu represents enumeration and mod represents modulo operation; and
   using a super frame corresponding to the super frame number as the super frame used for paging the UE.

3. The method according to claim 1, wherein the first parameter and the second parameter comprise a first parameter and a second parameter that are reported by the UE to the core network side.

4. The method according to claim 1, wherein the first parameter and the second parameter comprise a first parameter and a second parameter that are designated by the core network side.

5. The method according to claim 1, wherein determining that the current super frame matches the super frame used for paging the UE comprises:
   acquiring a super frame number of the current super frame; and
   determining that the current super frame matches with the super frame used for paging the UE when the super frame number of the current super frame is the super frame number of the super frame used for paging the UE.

6. The method according to claim 1, wherein delivering the paging message to the UE in the current super frame comprises:
   calculating, by the base station, a system frame, used for paging the UE, in the current super frame, and a subframe in the system frame; and
   delivering, by the base station, the paging message to the UE in the subframe in the system frame.

7. A paging method, comprising:
   acquiring, by a user equipment (UE), a first parameter comprising an extended discontinuous reception (eDRX) cycle and a second parameter used to identify a quantity of super frames for which a normal state lasts in the eDRX cycle;
   calculating a super frame used for receiving a paging message, the super frame being calculated by the UE according to a UE identifier of the UE, the first parameter, and the second parameter;
   determining that a current super frame is in the normal state by determining that a current super frame matches the super frame used for receiving the paging message; and
   receiving, by the UE in the current super frame, the paging message delivered by a base station.

8. The method according to claim 7, wherein calculating the super frame used for receiving a paging message comprises:
   performing a modulo operation on the UE identifier and the first parameter to obtain a third parameter; and
   acquiring a super frame number that meets the following formula: the super frame number mod the first parameter=Enu [the third parameter, (the third parameter+1) mod the first parameter, . . . , (the third parameter+the second parameter) mod the first parameter], wherein Enu represents enumeration and mod represents modulo operation; and
   using a super frame corresponding to the super frame number as the super frame used for receiving the paging message.

9. The method according to claim 7, wherein the first parameter and the second parameter comprise a first parameter and a second parameter that are set by the UE.

10. The method according to claim 7, wherein the first parameter and the second parameter comprise a first parameter and a second parameter that are delivered, during UE attach, by a core network side to the UE by using a non-access stratum NAS message.

11. The method according to claim 7, wherein the determining that the current super frame matches the super frame used for receiving the paging message comprises:
   acquiring a super frame number of the current super frame; and
   determining that the current super frame matches the super frame used for receiving the paging message when the super frame number of the current super frame belongs to the super frame number of the super frame used for receiving the paging message.

12. The method according to claim 11, wherein acquiring the super frame number of the current super frame comprises acquiring the super frame number that is of the current super frame and is broadcast by the base station by using system information, wherein the base station broadcasts, in the current super frame, the super frame number for a preset quantity of times; and
   wherein the system information comprises a system information block 1 or a reset system information block.

13. The method according to claim 7, wherein receiving the paging message delivered by a base station comprises:
   calculating, by the UE, a system frame, used for receiving the paging message, in the current super frame, and a subframe in the system frame; and
   receiving, by the UE in the subframe in the system frame, the paging message delivered by the base station.

14. A base station comprising a computer device including a non-transitory computer-readable medium storing program modules executable by the computer device, the modules including:
   a receiving module, configured to receive a paging message that is used for paging a user equipment (UE) and delivered by a core network side, wherein the paging message comprises a first parameter comprising an extended discontinuous reception (eDRX) cycle and a second parameter used to identify a quantity of super frames for which a normal state lasts in the eDRX cycle;
   a calculating module, configured to calculate a super frame used for paging the UE, the super frame calculated according to a UE identifier of the UE, the first parameter and second parameter;
   a determining module, configured to determine whether a current super frame matches with the super frame that is used for paging the UE and that is obtained by calculation by the calculating module; and
   a delivering module, configured to, when the determining module determines that the current super frame matches with the super frame used for paging the UE, deliver the paging message to the UE in the current super frame.

15. The base station according to claim 14, wherein the calculating module comprises:
   a third parameter acquiring submodule, configured to perform modulo operation on the UE identifier and the first parameter to obtain a third parameter; and
   a super frame number acquiring submodule, configured to acquire a super frame number that meets the formula: the super frame number mod the first parameter=Enu [the third parameter, (the third parameter+1) mod the first parameter, . . . , (the third parameter+the second parameter) mod the first parameter], wherein Enu represents enumeration and mod represents modulo operation, the super frame number acquiring submodule also being configured to use a super frame corresponding to the super frame number as the super frame used for paging the UE.

16. The base station according to claim 14, wherein the determining module comprises:
   a super frame number acquiring submodule, configured to acquire a super frame number of the current super frame; and
   a super frame matching submodule, configured to, when the super frame number of the current super frame acquired by the super frame number acquiring sub module belongs to the super frame number of the super frame used for paging the UE, determine that the current super frame matches with the super frame used for paging the UE.

17. The base station according to claim 14, wherein the delivering module comprises:
   a system frame and subframe calculating submodule, configured to calculate a system frame, used for paging the UE, in the current super frame, and a subframe in the system frame; and
   a paging message delivering sub module, configured to deliver the paging message to the UE in the subframe that is in the system frame and that is obtained by calculation by the system frame and subframe calculating sub module.

18. A base station, comprising:
   a transceiver, configured to receive a paging message delivered by a core network, the paging message being is used for paging a user equipment (UE), wherein the paging message comprises a first parameter comprising an extended discontinuous reception (eDRX) cycle and a second parameter used to identify a quantity of super frames for which a normal state lasts in the eDRX cycle; and
   a processor, configured to calculate a super frame used for paging the UE according to a UE identifier of the UE, the first parameter and second parameter and to determine whether a current super frame matches the super frame used for paging the UE;
   wherein the transceiver is further configured to deliver the paging message to the UE in the current super frame when the processor determines that the current super frame matches the super frame used for paging the UE.

19. The base station according to claim 18, wherein the processor is configured to perform a modulo operation on the UE identifier and the first parameter to obtain a third parameter, to acquire a super frame number that meets the following formula: the super frame number mod the first parameter=Enu [the third parameter, (the third parameter+1) mod the first parameter, . . . , (the third parameter+the second parameter) mod the first parameter], wherein Enu represents enumeration and mod represents modulo operation, and to use a super frame corresponding to the super frame number as the super frame used for paging the UE.

20. The base station according to claim 18, wherein the processor is configured to acquire a super frame number of the current super frame and to determine that the current super frame matches with the super frame used for paging the UE when the super frame number of the current super frame is the super frame number of the super frame used for paging the UE.

* * * * *